Oct. 28, 1924.
W. H. LANE
1,513,612
TIRE APPLIANCE
Filed Sept. 18, 1922    2 Sheets-Sheet 2
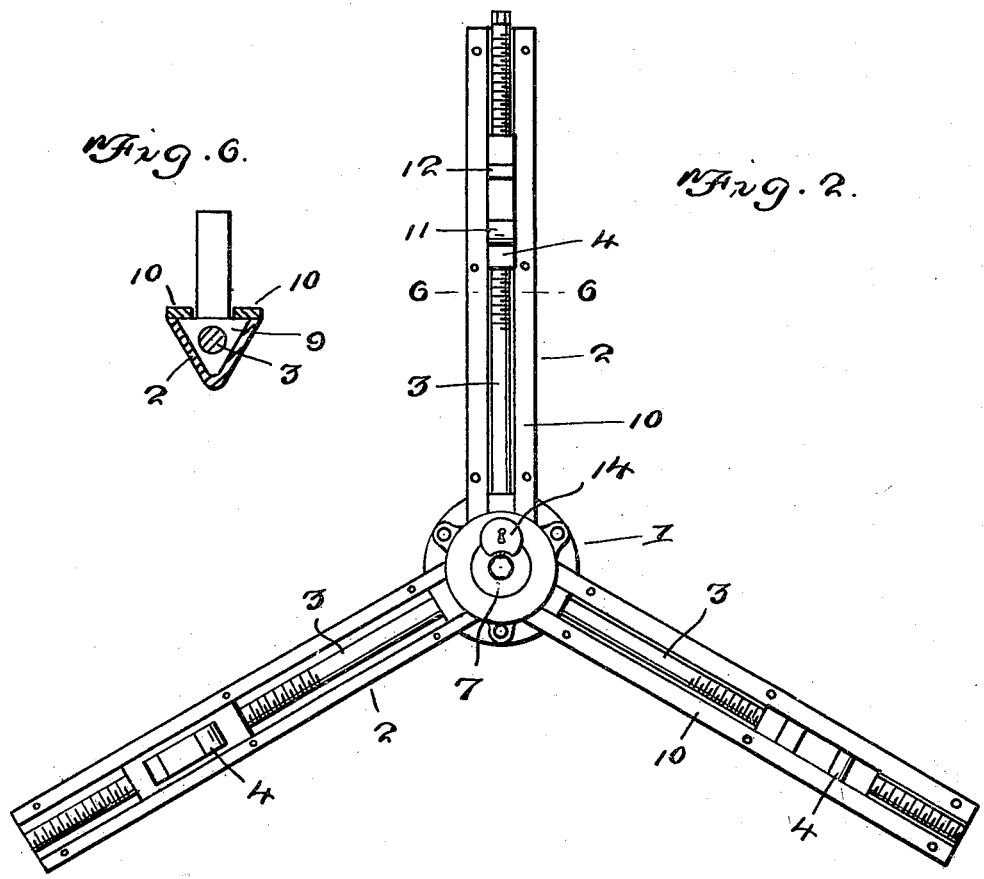
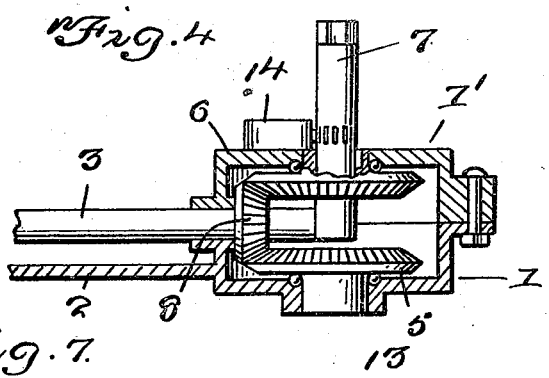
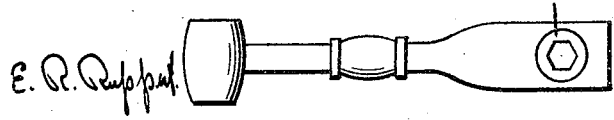
Wilson H. Lane
INVENTOR
BY Victor J. Evans
ATTORNEY
WITNESS:

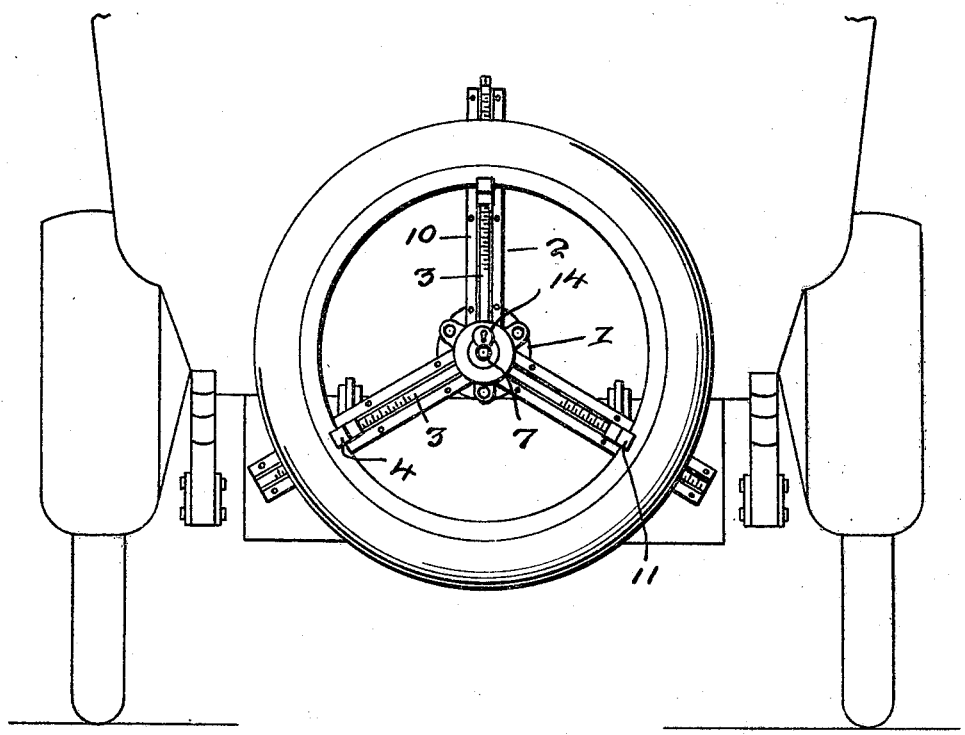
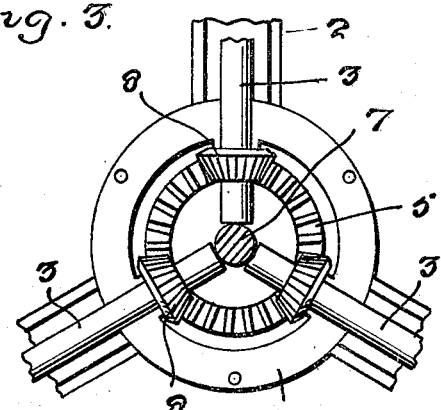
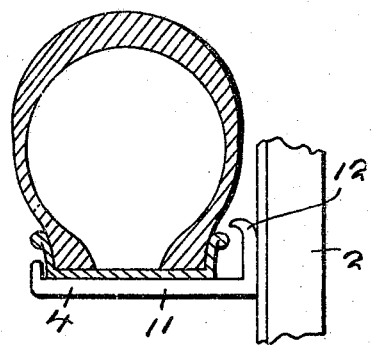

Patented Oct. 28, 1924.

1,513,612

UNITED STATES PATENT OFFICE.

WILSON H. LANE, OF ADA, OKLAHOMA.

TIRE APPLIANCE.

Application filed September 18, 1922. Serial No. 588,969.

*To all whom it may concern:*

Be it known that I, WILSON H. LANE, a citizen of the United States, residing at Ada, in the county of Pontotoc and State of Oklahoma, have invented new and useful Improvements in Tire Appliances, of which the following is a specification.

This invention relates to a combined tire carrier and tire changer, the general object of the invention being to provide a device which may be attached to an automobile and which has means for supporting a spare rim and tire and the parts of which may be actuated to contract the rim so that the tire may be removed therefrom or replaced thereon.

Another object of the invention is to provide means for locking the device with the rim and tire thereon so that the rim can not be removed without first unlocking the device.

A further object of the invention is to make the device adjustable so that it can be made to fit different sizes of tires and rims.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a view showing the device attached to the rear of an automobile.

Figure 2 is an enlarged view of the device alone.

Figure 3 is a view of the central part of the member with a part of the casing removed.

Figure 4 is a sectional view through Figure 3.

Figure 5 is a transverse section through a tire and its rim and showing the same mounted on one of the arms on the member.

Figure 6 is a section on line 6—6 of Figure 2.

Figure 7 is a view of the combined hammer and wrench used with the device.

As shown in these views, the device consists of a central casing 1, the radiating arms 2, the shafts 3 within the arms, the rim engaging members 4 movable by the arms and the gears in the casing for rotating the arms. the casing is formed of two parts, the inner part being connected with the arms and the outer part 1' being bolted to the inner part. Two gears 5 and 6 are arranged in the casing, the gear 5 being loosely mounted in the inner part and the gear 6 being arranged in the outer part and this gear is secured to a shaft 7, which is rotatably mounted in the casing and has its projecting end fitted to receive a wrench. The inner end of this shaft 7 may work against the inner ends of the shafts 3 and a ball bearing may be carried by said shafts for the shaft 7. Small gears 8 are secured to the inner ends of the shafts 3 within the casing and these small gears fit between and mesh with the gears 5 and 6. The arms are provided with V shaped grooves which extend longitudinally and these grooves receive the shafts 3. A V shape block 9 is threaded on each shaft 3 and this block is held in the groove by the strips 10 which are secured to the arms. A long rim engaging member 11 is connected with each block and a short rim engaging member 12 is also connected with each block, the short members being arranged near the inner ends of the blocks. One of the shafts 3 is extended beyond the end of its arm and is formed to receive a wrench so that it can be turned. I prefer to form the wrench socket in a hammer handle, as shown at 13, so that the wrench will form a tool for locking and unlocking the catch of the rim and for other purposes. The casing is provided with a lock 14 for locking the shaft 7 against movement and thus locking all the gears together so as to prevent the rim from being removed from the device without first unlocking the small shaft.

The device is attached in any desired manner to the rear or other part of a motor vehicle so that a rim with a tire thereon may be placed on the arms between the rim engaging members. By rotating the small shaft 7 with the wrench or the long shaft 3 with the wrench the gears are revolved so as to rotate the shafts and thus move the blocks which carry the rim engaging members longitudinally on the arms. This will secure the rim to the device or permit it to be removed therefrom. When the device is to be used to contract a rim, the blocks are moved inwardly until the short members 12 engage the rim when further movement will cause them to contract the rim and thus permit the tire to be removed therefrom. Thus the device will act as a tire changer without removing it from the car as in the position it occupies it can be easily worked to remove and replace a tire and it is not necessary for one to kneel or bend over to do this work. By locking the short shaft in the casing the tire and rim are locked on the device.

It is thought from the foregoing description that the advantages and novel features of my invention will be readily apparent.

I desire it to be understood that I may make changes in the construction and in the combination and arrangement of the several parts, provided that such changes fall within the scope of the appended claim.

Having thus described my invention what I claim as new is:

A combined tire carrier and changer comprising a casing, arms radiating from the same and each provided with a V-shaped groove in one face, blocks sliding in the grooves, a pair of flanges carried by each block, a screw shaft located in each groove and engaging the block therein, said shaft extending into the casing, a pair of gears in the casing, gears on the shaft engaging the pair of gears, the shaft of one gear of the pair extending through the casing and having a wrench receiving part thereon and the outer end of one of the shafts being provided with a wrench receiving part.

In testimony whereof I affix my signature.

WILSON H. LANE.